United States Patent
Sabdar et al.

(10) Patent No.: US 9,697,215 B2
(45) Date of Patent: Jul. 4, 2017

(54) SYSTEMS AND METHODS FOR RESUMABLE REPLICATION

(71) Applicant: Oracle International Corporation, Redwood City, CA (US)

(72) Inventors: Reza Sabdar, Irvine, CA (US); Mark Shellenbaum, Westminster, CO (US); Peter W. Cudhea, West Newton, MA (US); Richard J. Morris, Newton, MA (US); Michael L. Gerdts, Madison, WI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 303 days.

(21) Appl. No.: 14/477,582

(22) Filed: Sep. 4, 2014

(65) Prior Publication Data

US 2015/0066858 A1 Mar. 5, 2015

Related U.S. Application Data

(60) Provisional application No. 61/873,793, filed on Sep. 4, 2013.

(51) Int. Cl.
*G06F 17/30* (2006.01)

(52) U.S. Cl.
CPC ............. *G06F 17/30088* (2013.01)

(58) Field of Classification Search
CPC .................................... G06F 17/30088
See application file for complete search history.

(56) References Cited

U.S. PATENT DOCUMENTS

| 2006/0184587 | A1* | 8/2006 | Federwisch | ......... G06F 11/1451 |
| 2009/0030983 | A1* | 1/2009 | Malaiyandi | ......... G06F 11/1076 709/204 |

* cited by examiner

*Primary Examiner* — Robert Beausoliel, Jr.
*Assistant Examiner* — Hau Hoang
(74) *Attorney, Agent, or Firm* — Kilpatrick Townsend & Stockton LLP

(57) ABSTRACT

Implementations described and claimed herein provide systems and methods for resumable replication. In one implementation, an interruption in a transfer between a source and a target is identified. The transfer includes a send stream generated by the source and configured for receipt by the target. The send stream includes one or more snapshots of the source. A receive checkpoint generated by the target is received at the source. The receive checkpoint indicates data successfully received into the target during the transfer prior to the interruption. The transfer is resumed based on the received checkpoint. The resumed transfer skips any of the one or more snapshots and all data in a resumable snapshot already existing on the target. A complete transfer from the source to the target is verified using a chain of custody.

20 Claims, 8 Drawing Sheets

SYSTEMS AND METHODS FOR RESUMABLE REPLICATION

CROSS-REFERENCE TO RELATED APPLICATIONS

The present application claims benefit of priority under 35 U.S.C. §119 to U.S. Provisional Patent Application No. 61/873,739, entitled "Method and Apparatus for Restartable Replication" and filed Sep. 4, 2013, which is incorporated by reference in its entirety herein.

FIELD OF THE DISCLOSURE

Aspects of the present disclosure relate to network file systems utilizing storage appliances. More specifically, aspects of the present disclosure involve resuming replication of a storage appliance following an interruption.

BACKGROUND

The continuous expansion of the Internet, the expansion and sophistication of enterprise computing networks and systems, the proliferation of content stored and accessible over the Internet, and numerous other factors continues to drive the need for large sophisticated data storage systems. Consequently, as the demand for data storage continues to increase, larger and more sophisticated storage systems are being designed and deployed. Many large scale data storage systems utilize storage appliances that include arrays of storage media. These storage appliances are capable of storing incredible amounts of data. For example, at this time, Oracle's SUN ZFS Storage 7420 appliance can store over 2 petabytes of data (over 2 quadrillion bytes of data). To further increase the volume of stored data, multiple storage appliances may be networked together to form a cluster. Storage appliances arranged in a cluster may be configured to mirror data so that if one of the storage appliances becomes inoperable, the data is available at another storage location.

Further, a storage network may support snapshot-based replication of a source storage appliance on a target storage appliance for disaster recovery, data distribution, disk-to-disk backup, data migration, and the like. Snapshots are read-only copies of a file system or volume on a storage appliance. During replication, snapshots of the various file systems and volumes on the source storage appliance are generated and transferred to the target storage appliance. Data blocks corresponding to the snapshots are then transferred block by block from the source storage appliance to the target storage appliance. Replication is often a time intensive process and thus, may be susceptible to interruption. Conventionally, the replication process is restarted following an interruption by creating a new set of snapshots, with the transfer starting over from the last replication snapshot that the target received completely and accurately. However, after the interruption, large portions of this new set of snapshots may already exist on the target storage appliance. Accordingly, both the target storage appliance and the source storage appliance pay a significant cost in unneeded snapshots, data transfer, and skipping over steam contents that have already been processed.

It is with these observations in mind, among others, that various aspects of the present disclosure were conceived and developed.

SUMMARY

Implementations described and claimed herein address the foregoing problems, among others, by providing systems and methods for resuming replication of a source following an interruption. In one implementation, an interruption in a transfer between a source and a target is identified. The transfer includes a send stream generated by the source and configured for receipt by the target. The send stream includes one or more snapshots of the source. A receive checkpoint generated by the target is received at the source. The receive checkpoint indicates data successfully received into the target during the transfer prior to the interruption. The transfer is resumed based on the received checkpoint. The resumed transfer skips any of the one or more snapshots and all data in a resumable snapshot already existing on the target. A complete transfer from the source to the target is verified using a chain of custody.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
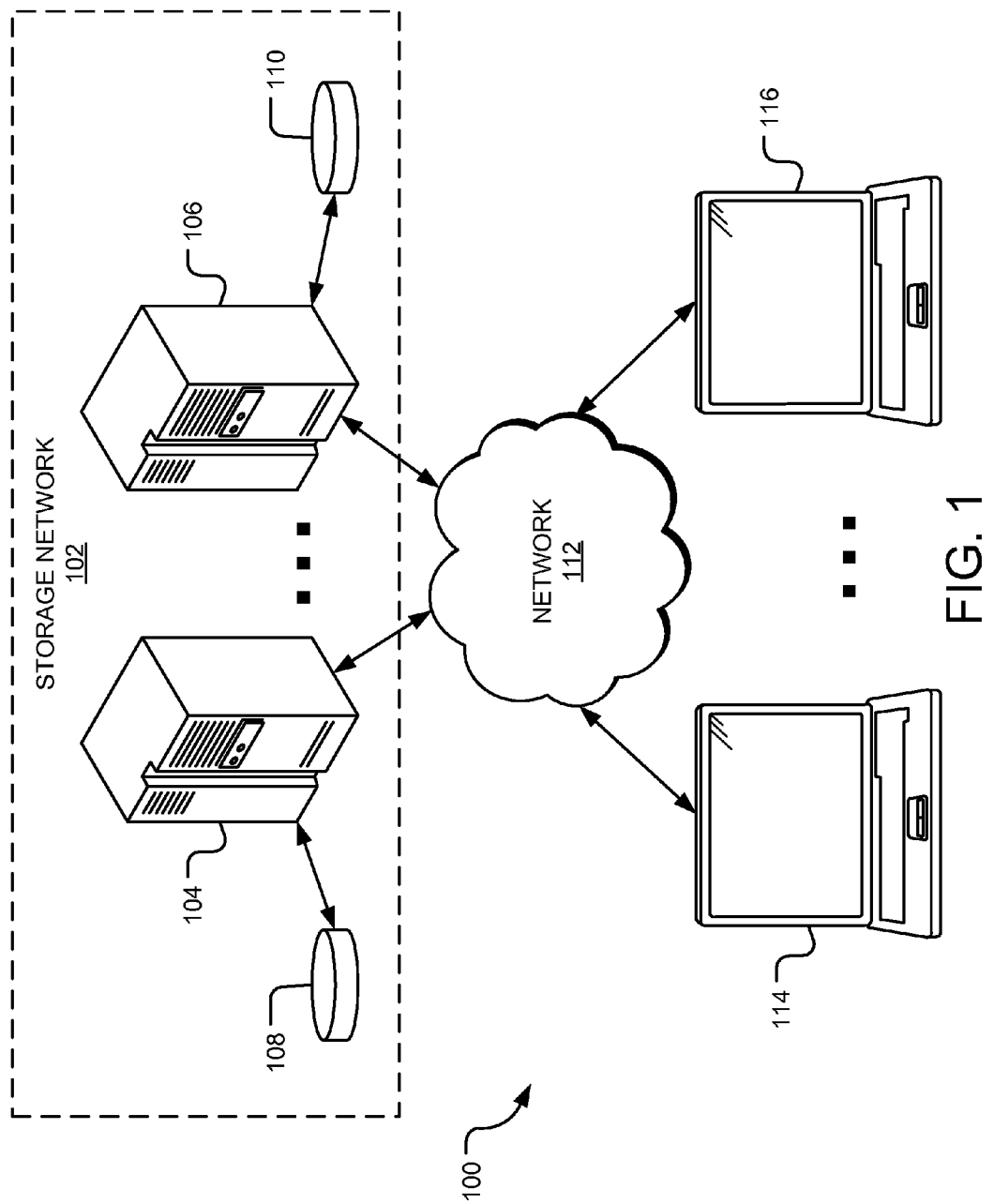
FIG. 1 illustrates an example storage system including a storage network having one or more storage appliances interconnected with one or more user devices over a network, the storage network supporting resuming a replication after an interruption.

Generally, aspects of the present disclosure involve resuming a send/receive transfer replicating a source on a target following an interruption, such as a network outage, a system outage (e.g., a panic on either the source or the target), or a checksum error or other data degradation detected in the incoming stream from the source. To resume a send/receive transfer at the point of interruption, the source and the target coordinate. Generally, in resuming the transfer at the point of interruption, data already existing on the target is not resent. However, in some cases, some or all of the data may be resent. The target determines a point where the transfer was interrupted and communicates that point to the source, which generates a new send stream resuming the transfer at that point. The target receives the new stream and splices the new stream together with the previously-received contents prior to the interruption. The replication process ensures that no data is lost or reordered during the replication. Stated differently, for the replication to be trustworthy, an uninterrupted chain of custody is provided ensuring that: what is sent by the source matches what is already on the target; what is received by the target matches what is sent by the source; and what is stored on the target matches what was received.

In one particular aspect, during a replication, a sequence of send stream passes are generated from a project (i.e., a hierarchical collection of datasets) on a source and are received into a matching replication package (i.e., a matching collection of hierarchical datasets) on a target. Each pass consists of a send of data from the source and a matching receive of the data on the target. An initial full send stream starts the first pass, and successive passes are incremental streams that are generated either on a schedule or continuously. After an interruption, rather than starting a new replication pass by creating a new set of snapshots, the current pass is resumed. Specifically, the source reuses the existing replication snapshot and determines from the target how much of that snapshot has already been received by the target. Only the portion that was not yet processed is sent. The current replication pass may be resumed as many times as necessary to complete the pass.

In some aspects, a receive checkpoint is sent from the target to the source to prune portions of the send stream. Stated differently, when a receive operation of a replication transfer is interrupted in the middle of a snapshot, the partially received dataset constitutes a file system or volume that is inconsistent (i.e., cannot be mounted or used) but that is saved persistently for resumption of the send/receive transfer. Such a resumable dataset is hidden for use as part of a receive checkpoint to resume the interrupted send/receive transfer. A receive checkpoint is a summary of what has been received by the target successfully. In other words, the receive checkpoint informs the source of what the receive destination on the target already contains, so the source can filter out items that have already been successfully sent. Thus, the source resumes the transfer at a point that the source and the target share. In some cases, the receive checkpoint may include a bookmark of the resumable dataset. The bookmark indicates how much of the resumable dataset has been successfully received and where to resume the simple stream (i.e., data portions of a single snapshot) to finish creating the incoming snapshot. The source resumes sending the snapshot if the data that was partially received is still relevant to the transfer. If the transfer cannot be resumed, the send will fail. Once the source detects that the target has all the requested data, the target returns a success indicator completing the transfer.

It will be appreciated that aspects of the present disclosure may be used to increase overall system performance during replication in a variety of storage environments by eliminating the need to resend and subsequently ignore data that has already been successfully sent. Aspects of the present disclosure apply to various computing devices including, without limitation, storage appliances, computers, and other storage devices or computing devices configured to replicate data. For example, various implementations describe systems and methods for determining the progress of replication between a first storage appliance and a second storage appliance or a single storage appliance and an archiving system and using that determination to resume an interrupted replication at the point where it was interrupted. In some aspects, additional error checking is provided to ensure data integrity by marking non-reliable data for elimination from future replications, thereby ensuring that any problems in the storage appliance are not replicated to another system or backup.

For a detailed description of resumable replication, reference is made to FIG. 1. As can be understood from FIG. 1, an example storage system 100 includes a storage network 102 including one or more storage appliances 104-106 including storage media 108-110. Generally, the storage appliances 104-106 manage the storage of data on the storage media 108-110, which may involve spinning media (e.g., disc drives) as well as various forms of persistent memory, such as solid state memory. Although discussed herein in the context of a ZFS storage appliance, the storage appliances 104-106 may be any conventional storage appliance. ZFS is a combined file system and volume manager designed by Sun Microsystems® in 2005 that allows for data integrity verification and repair, high storage capacities, along with numerous other features and advantages.

In one implementation, the storage system 100 includes a client network having one or more user devices 114-116. The storage network 102 is accessible by the client network using a network 112. It will be appreciated, however, that the various networks may comprise an integrated network, and the connections between the networks represent but one possible network topology. The various networks may also be local in nature or geographically dispersed, such as with large private enterprise networks or the Internet. The user devices 114-116 are generally any form of computing device capable of interacting with the network 112, such as a terminal, a workstation, a personal computer, a portable computer, a cellphone, a mobile device, a tablet, a multimedia console, and the like. In some implementations, the client network includes one or more user interfaces, including, for example, a browser user interface (BUI), permitting a client to interact with the storage network 102 to access data.

ZFS based systems utilize a storage pool layer having one or more storage pools (often referred to as "zpools") comprising virtual devices (vdevs) constructed of block devices, such as the storage media 108-110. A block device is any device that moves data in the form of blocks, which may be, without limitation, hard disk drives, solid state drives, optical drives, magnetic drives, and other addressable regions of memory. A ZFS volume is a dataset that represents a single block device. A virtual device may span a number of block devices or volumes, and a storage pool may include one or more virtual devices, each including one or more partitions of storage media or one or more storage media.

Traffic to and from the storage appliance 104, 106 is typically managed by one or more dedicated storage servers located within the storage appliance 104, 106 or the storage network 102. A common protocol employed by the storage appliance 104, 106 for accessing content, including files, directories, and their associated metadata is a Network File System (NFS). NFS is a widely used distributed file system protocol, originally developed by Sun Microsystems® in 1984 and currently in version 4 (NFSv4). NFS allows the client network 104 to access stored data seamlessly by providing a programming interface permitting the user devices 114-116 to: create and delete files; read and write files; perform seeks within a file; create and delete directories; manage directory contents; and perform other file, directory, or content operations. The operating system utilized by the user devices 114-116 is configured to communicate with the NFS programming interface to manage the file system and the interaction between executing applications with data residing in the storage appliance 104, 106. In one implementation, the storage appliance 104, 106 is configured to operate using NSFv4 or the current NFS version. Generally, NFS systems manage file system metadata and provide access to files and directories. The metadata describes the location of the files and directories on the storage media 108, 110. The storage appliance 104, 106 maintains a log of current operations being performed by the client network.

One feature of computing systems running ZFS, as well as other file systems, is the ability to perform replication operations, among other functions. Replication allows for a first system (e.g., a source storage appliance 104) to create a replica of itself or a portion of itself on another system (e.g., a target storage appliance 106) by utilizing snapshots. For example, a snapshot may include an image of the source storage appliance 104 that may be used to recreate the state of the source storage appliance 104. More specifically, a snapshot is a read-only copy of a file system or volume on the source storage appliance 104 or other storage device that includes information needed to reproduce the file system or volume at the time of the snapshot. Using the snapshots, the user devices 114-126 may discard a latest change causing a problem and revert to an earlier functional state.

Generally, snapshots can be created efficiently and initially consume minimal disk space on the storage appliance 104, 106. However, as the data corresponding to the snapshot changes, the snapshot increases in size. For example, when a snapshot is initially created, it may simply contain a pointer to the actual file system or volume. As the data covered by the snapshot changes, the snapshot is updated to include information regarding these changes to include the information needed to reproduce the file system or volume at the time of the snapshot.

In one implementation, the source storage appliance 104 is configured to regularly create snapshots and transfer those snapshots to the target storage appliance 106 for replication. The regular generation and transfer of the snapshots provides relative synchronization between the storage appliances 104, 106 similar to a distributed replicated block device (DRBD) which mirrors a whole block device via an assigned network.

During replication, send/receive commands are exchanged between the source storage appliance 104 and the target storage appliance 106. Snapshots of the various file systems and pools on the source storage appliance 104 are generated and transferred to the target storage appliance 106. The data stored on the source storage appliance 104 corresponding to the snapshot is then transferred block by block to the target storage appliance 106. Often, the transfer of all the data blocks from the source storage appliance 104 to the target storage appliance 106 is a time intensive process, particularly where the source storage appliance 104 hosts multiple file systems. To fully replicate the source storage appliance 104 in this case, snapshots of the multiple file systems are sent from the source storage appliance 104 to the target storage appliance 106.

In one implementation, the snapshots and corresponding data are sent via a send stream, which is the sequence of bytes generated by a source system, pool, or dataset (e.g., the source storage appliance 104) and received by a target system, pool, or dataset (e.g., the target storage appliance 106). Replication is a feature based on a send command to generate the send stream from the source dataset hierarchy and a receive command to create or update a target dataset hierarchy from the send stream to keep a target package on the target storage appliance 106 up to date with the contents of a source project on the source storage appliance 104.

Generally, the data that will be sent to the target storage appliance 106 may be divided into a series of streams referred to as simple streams. There are three types of simple streams: a full simple stream, an incremental simple stream, and a clone simple stream. The full simple stream contains the full contents of a single snapshot of a dataset, preserving no intermediate snapshots. A full simple stream may be generated from any dataset, whether standalone or clone. An incremental simple stream contains the changes in the contents from one snapshot to another snapshot and can be generated from any two snapshots belong to the same dataset or from a clone origin to a snapshot in that clone. A clone simple stream introduces a new clone.

The simple streams may be sent and received as a standalone unit or collectively as a compound stream. A compound stream is a combined stream that contains multiple simple streams and a table of contents and properties (TOC). Stated differently, a compound stream includes an initial TOC stream containing the table of contents and properties of the stream, followed by a sequence of sub streams, each of which is a simple stream, followed by a final END record. The TOC describes the datasets and snapshots in a stream or in the source storage appliance 104 as a whole, with their associated properties and shares.

The send stream may include an on-the-wire format having per-record checksums to detect data degradation in the stream. For various reasons, including, without limitation, network outages, system outages or reboots, or a checksum error on the wire, the replication process may be interrupted. The per-record checksums ensure that if the receipt of a simple stream is interrupted, the data that was received before the interruption can be trusted to have been correctly received and thus, can be committed to disk.

In one implementation, the storage network 102 includes a one-way traffic communication flow from the source storage appliance 104 to the target storage appliance 106 with a limited back-channel that is one-way from the target storage appliance 106 to the source storage appliance 106 to instruct the source storage appliance 106 where to resume the replication should an interruption occur. In one implementation, resuming a transfer in the middle of a single snapshot sent is possible when the original transfer used per-record checksums. In another implementation, the transfer resumes at the most recent snapshot boundary. In any event, the transfer avoids resending snapshots that have already been completely received on the target storage appliance 106.

The systems and methods described herein provide an unbroken chain of custody at all levels of the send/receive transfer demonstrating that the replication is complete, reliable, and stable, thereby allowing for the resumption of send operations in the middle of a compound stream and in the middle of a single simple snapshot pair within that compound transfer. In other words, the chain of custody verifies that a complete transfer is performed from the source storage appliance 104 to the target storage appliance 106, leaving nothing out. The replication is resilient to dataset namespace changes that occur on the source storage appliance 104 during the overall requested transfer and resumed transfer. Recoverable namespace changes may include, without limitation, a rename, destroy or promote of a dataset, or a rename or destroy of a non-replication snapshot. Any errors that make the requested transfer impossible to complete are detected quickly and trigger an alert or exit the send command with a fatal error.

During a resumable replication generally, the source storage appliance 104 generates a collection of snapshots containing data to be sent to the target storage appliance 106. The source storage appliance 104 generates a send stream containing the snapshots, and the target storage appliance 106 receives the stream. If the transfer is interrupted, the source storage appliance 104 and the target storage appliance 106 cooperate to resume the transfer at the point it left off, as modified by asynchronous rename, destroy, and promote operations on the source storage appliance 104. The process repeats until the send stream has been fully received by the target storage appliance 106 and the transfer is declared to be complete.

Where a receive operation of the transfer is interrupted in the middle of a snapshot, the partially received data constitutes a dataset that is incomplete (i.e., cannot be mounted or used) but that is saved persistently to allow the overall send/receive transfer to resume at the point the receive was interrupted. Such a resumable dataset is preserved on the target storage appliance 106 based on the per-record checksum, which verifies the integrity of the data. From the resumable dataset on the target storage appliance 106, a bookmark indicating how much of the incoming stream was successfully made durable before the interruption may be identified. In other words, a bookmark is an indicator of how much of the resumable dataset has been successfully received by the target storage appliance 106 and of where to resume the simple stream to finish creating the snapshot. The resumable dataset is used to resume a bookmark simple stream, which is a simple stream containing only the contents that follow the bookmark.

The bookmark is used to uniquely identify the state of the resumable dataset after an interruption. For example, examining the state of the resumable dataset may indicate that it was cloned off of a Monday snapshot, and scanning for recently changed objects and blocks may reveal that the most recently committed whole block is a particular object at a particular offset. However, this information alone fails to indicate whether the source storage appliance 104 was in the middle of sending the range from Monday to Wednesday or whether it was only sending from Monday to Tuesday. Whichever transfer was in progress is the only one that can be resumed. More specifically, if the Monday to Wednesday transfer is attempted to be resumed into a dataset that was actually in the middle of receiving a Monday to Tuesday transfer, the results would be incorrect. For the source storage appliance 104 to resume sending what it was sending before, the source storage appliance 104 verifies that it is starting over the same simple stream with exactly the same set of snapshots. Accordingly, the state of resumable dataset is reflected via the bookmark, which is a read-only hidden property. The bookmark includes various properties representing the status of the interrupted transfer and how much of the transfer was made durable before the interruption. The bookmark properties include, without limitation, a version, an object (an object number of the object most recently touched or deleted), an offset (byte offset of a byte that is known to have been recently updated), a unique value (an estimation of a size of the resumed stream), a dsguid (the target-side dataset guid of the resumable dataset to aid the target storage appliance 106 in locating the dataset again), a fromguid (a guid of previous snapshot), a toguid (a guid of the snapshot being received), and a verifier (opaque data the source storage appliance 104 will return to the target storage appliance 106 when resuming).

In one implementation, the object and offset fields of the bookmark are calculated on demand by traversing the resumable dataset for a high water mark of the current snapshot. Looking only at data more recent than the origin snapshot of the resumable dataset, the largest object number that was modified at the same block birth time as the resumable dataset is identified and defined as the object for the bookmark. Starting with the root block pointer for that object, the indirect blocks of the object are scanned to locate the largest block number that was modified at this same block birth time. The offset for the bookmark is the byte offset of the start of this block. Given that block sizes can differ between source and target, it is known that some byte in the block was modified in the designated transaction, but it is unknown how many bytes were altered. Accordingly, to preserve the chain of custody, the bookmark instructs the source storage appliance 104 to resume the transfer at the start of that block.

In one implementation, resumable datasets are used as part of a receive checkpoint to resume an interrupted send/receive transfer. The receive checkpoint provides a summary of what has been received successfully by the target storage appliance 106 and is delivered to the source storage appliance 104 to resume the interrupted transfer. If a resumable dataset exists, the receive checkpoint includes the appropriate bookmark to allow resuming that part of the transfer in the middle.

In other words, to resume an interrupted transfer, the target storage appliance 106 generates the receive checkpoint indicating how much of the transfer was made durable. The receive checkpoint contains at least a list of all snapshots that currently exist under the receive destination. In one implementation, a TOC is generated detailing this information. The receive checkpoint permits replication to resume from any initial source and target state. The underlying request is to make the target storage appliance 106 look like the source storage appliance 104, starting from what the source storage appliance 104 and the target storage appliance 106 already have in common. Using just a bookmark, may result in the order of the simple streams within a compound stream not being stable in the face of renames and destroys. Generally, parent file systems are sent before children, clones are sent before origins, and children are sent in a non-stable order based on name. Renames and destroys may disrupt this order or completely change parent-child relationships. Accordingly, sending the entire TOC permits the source storage appliance 104 to determine what needs to be resent, independent of the order. Once the TOC has been completely received, the source storage appliance 104 may search it for occurrences of the bookmark property and mark resumable datasets for special processing as described herein.

To resume an interrupted send, in one implementation, the target storage appliance 106 sends a request to the source storage appliance 104. The source storage appliance 104 uses the receive checkpoint to cross-verify that the request to resume the transfer is still valid given what now exists on the source storage appliance 104 compared to the target storage appliance 106. If the requested transfer has become impossible based on the comparison (e.g., the target storage appliance 106 destroyed or is missing a snapshot), the resumed send will trigger an alert or exit with a fatal error. Otherwise, using the receive checkpoint, the source storage appliance 104 can quickly skip over entire snapshots in the source hierarchy that already exist on the target storage appliance 106. Moreover, the bookmark information in the receive checkpoint allows the resumed transfer to start off with a bookmark stream that can be received into the resumable dataset saved from the original replication attempt.

When the target storage appliance 106 receives the resulting bookmark stream, the target storage appliance 106 may use the bookmark information in the bookmark stream to find the resumable dataset and verify the bookmark information in the bookmark stream against the bookmark information in the resumable dataset, thereby ensuring that the chain of custody of the snapshot that was interrupted remains intact. Once the chain of custody is assured, the incoming stream is spliced with the partially stored dataset as the original send stream would have been stored. When the incoming simple stream has been completely received, the resumable dataset is made into a permanent snapshot as any normal incoming simple stream would have been.

Accordingly, once the source storage appliance 104 receives the received checkpoint, the source storage appliance 104 regenerates a compound stream from the received checkpoint to resume the transfer. In doing this, the source storage appliance 104 verifies the requested stream characteristics against the target checkpoint to ensure the stream still makes sense to send. If not, the source storage appliance 104 generates a fatal error. If so, the source storage appliance 104 modifies the stream header to identify the stream as a resumed stream and starts the resumed stream with any bookmark streams to complete any partially received snapshots. The source storage appliance 104 then continues a normal traversal of datasets and snapshots on the source storage appliance 104 while skipping any snapshots that already exist on the target storage appliance 106. The source storage appliance 104 modifies the TOC to identify any snapshots that are already present on the target storage appliance 106 for the target storage appliance 106 to cross-verify that it still has every snapshot that it is expected to have.

In one implementation, in skipping snapshots in the compound stream, the source storage appliance 104 identities a range of snapshots to send. The snapshots in each dataset are first ordered by creation time and two passes through the list of snapshots are performed. The first pass, in order from newest to oldest, locates a base snapshot, which is the most recent snapshot already present on the target storage appliance 106. The second pass, in order from oldest to newest, sends the substreams.

Figure 2:
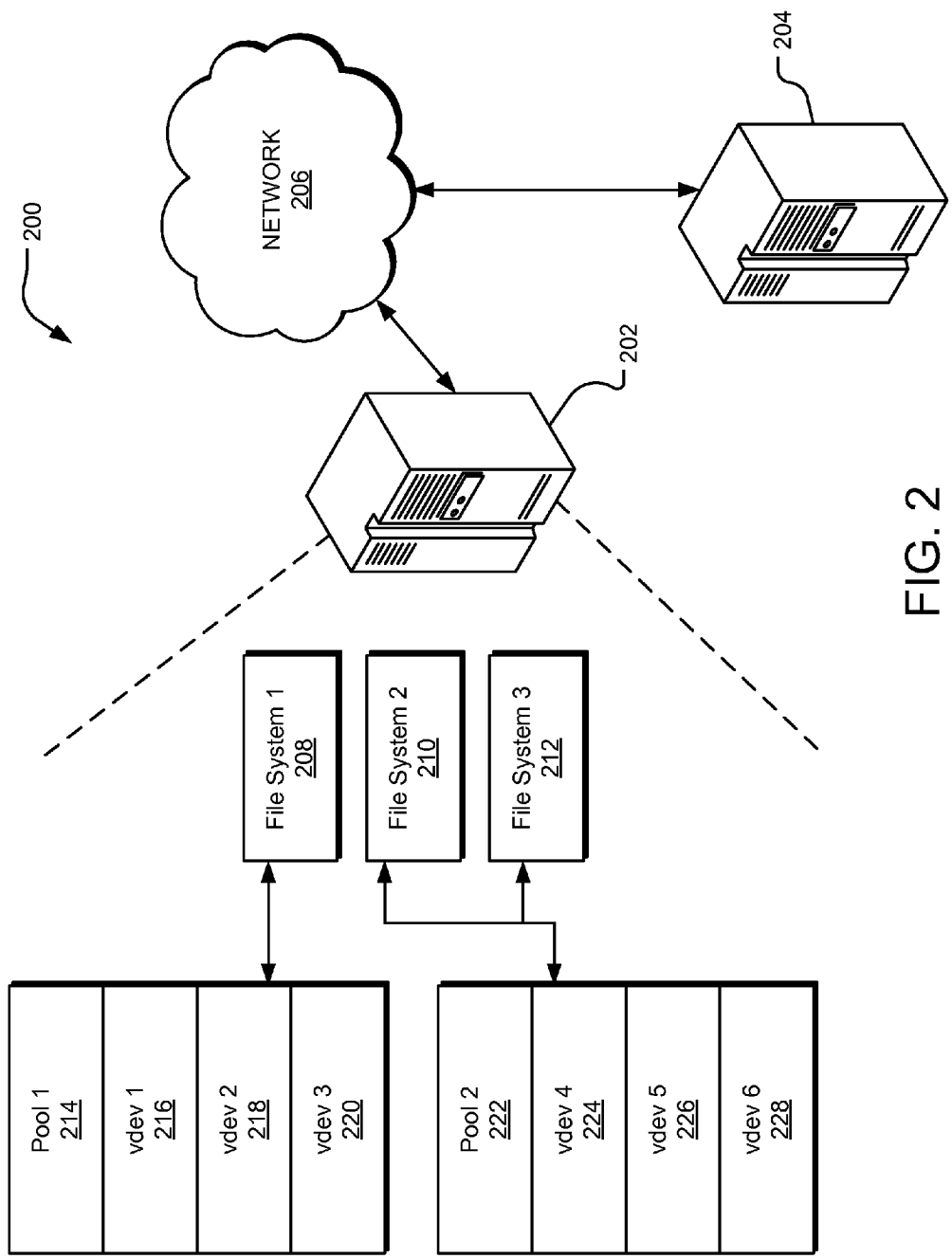
FIG. 2 shows an example storage system with a first storage appliance operating with multiple file systems in communication with a second storage appliance over a network, the storage network supporting resuming a replication after an interruption.

As can be understood from FIG. 1, replication passes after an interruption will complete quickly and efficiently by preserving and reusing data that was already successfully sent and received. Turning to FIG. 2, an example storage system 200 is shown. As can be understood from FIG. 2, a first appliance 202 in communication with a second appliance 204 over a network 206 or other form of communication are provided.

In one implementation, each appliance 202, 204 manages files and facilitates access to the files through a file system, such as ZFS. For example, the first appliance 202 is operating using multiple file systems 208, 210, 212 spread across storage pools 214, 222, each including a plurality of virtual devices (vdevs) 216-220 and 224-228. The first file system 208 is configured on the first pool 214 and the second file system 210 and the third file systems 212 are each configured on the second pool 222. It should be understood that in various other examples, the first appliance 202 and the second appliance 204 may be configured with any number of file systems, pools, volumes, and virtual devices. The second appliance 204 also includes one or more pools, each with one or more vdevs, and may also include one or more file systems. In this example, the first appliance 202 and the second appliance 204 may be configured to host one or more of the same file systems 208, 210, 212.

Figure 3:
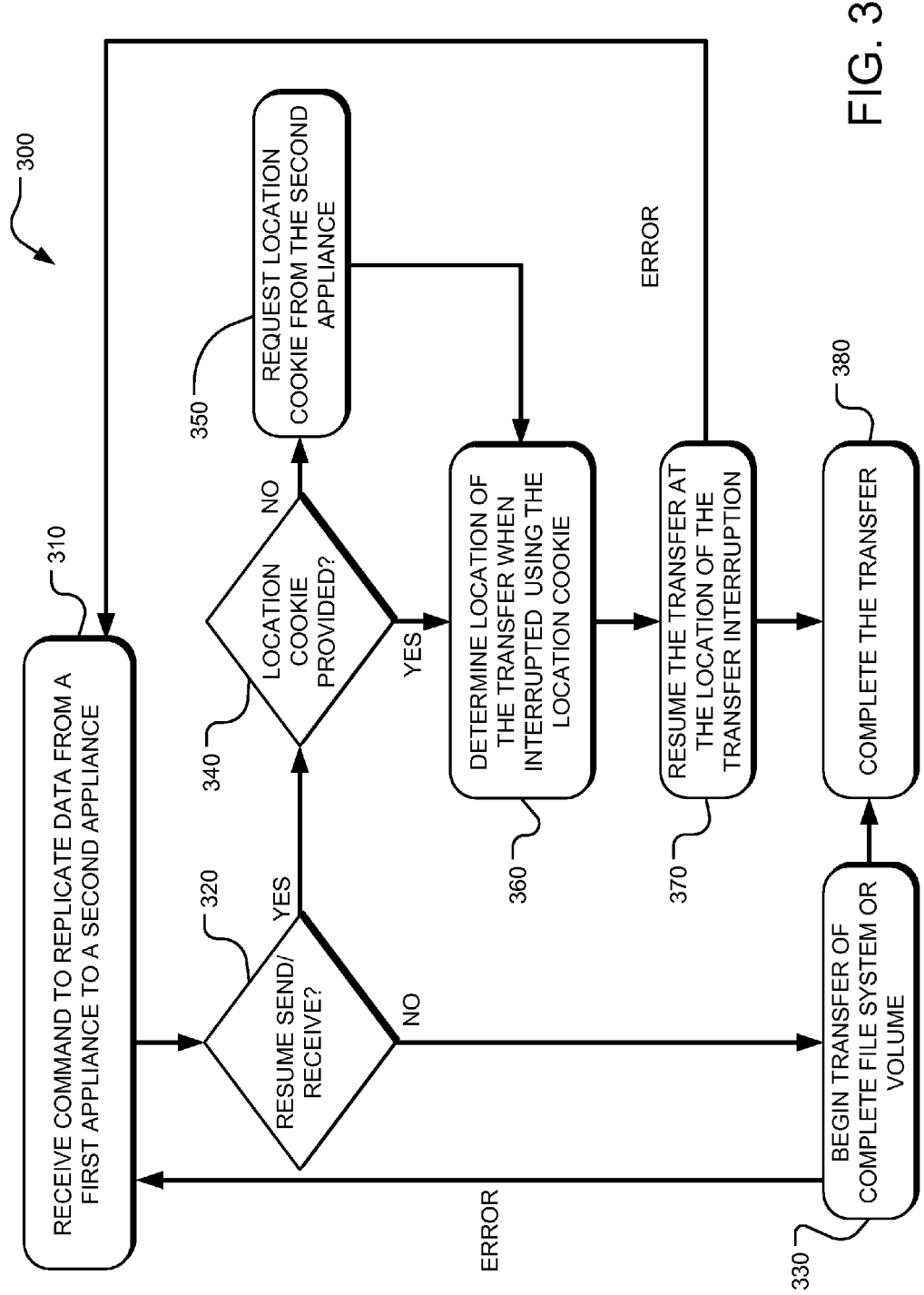
FIG. 3 illustrates example operations for a resumable replication send.

Referring to FIGS. 2 and 3, example operations 300 for resumable replication process are shown. In this example, a send data command entered at the first appliance 202 initiates replication to the second appliance 204 (operation 310). The send command may not immediately start the sending of data, but may initiate the process by specifying that the replication is resumable, an indication of the destination for the data (e.g. the network address of the second appliance 204), and an identification of the data being replicated data will be sent. Contemporaneous to initiation of the replication on the first appliance 202, an intent to receive command may be issued at the second appliance 204 (operation 310). The receive command may be used to alert the second appliance 204 that replication is commencing and may include an indication that the replication is and the destination of the data. The send and receive commands may be manually entered by a user on the first and second appliances 202, 204, or they may be automatically entered on each appliance by a script or by the operating system.

Before starting replication, the system may determine whether the replication is a continuation by analyzing the send/receive commands (operation 320). If the replication is an entirely new replication, the first appliance 202 records the data that will be sent to the second appliance 204. Similarly, the second appliance 204 records what data will be sent, the destination location of where the data will be stored on the second appliance 204, and creates a cookie log for storing cookies indicating the current position of the replication. As will be discussed in detail below, each data block being sent from the first appliance 202 to the second appliance 204 may include information identifying the data block. By storing this information or "cookies" in the cookie log, the last data block received may be determined. After the initialization of the first and second appliances 202, 204, a send/receive process may then begin by transferring the snapshots and datasets making up a file system or contained in a volume from the first appliance 202 to the second appliance 204 (operation 330), and assuming no errors, the replication process will be completed (operation 380). As data is received at the second appliance 204, the integrity of the data may be verified using header information and verified good data may be committed to the received dataset and identifying the data may be logged. If the transmission is interrupted by an error, then the transfer may be resumed (operation 310).

Cookies identifying the location in the data transfer or stream may be used to determine where a replication left off in the case of a disruption. In the case of a disruption, the send and receive commands each indicate that replication is being resumed the system will determine whether a location cookie was manually provided by a user (operation 340). The cookie may include any information necessary to determine the location of where a transfer stopped and is usable by the sender to regenerate the sending stream from that location. For example, in various implementations, the replication may include one or more snapshots, each including a plurality of data blocks. Replication may operate sequentially in that snapshots are sent after another and the data blocks that are included in each snapshot are also sent one at a time. In this example, the cookie may include a byte offset identifying a location in a snapshot and a byte offset identifying a location of a snapshot in a multi-snapshot replication. By including byte offsets, each cookie may be sufficient for identifying which snapshots have been sent, which snapshots have not been sent, and where to resume the replication. If no location cookie has been provided, the first appliance 202 may send a request to the second appliance 204 for the last cookie entered onto the second appliances cookie log(operation 350). Once the first appliance 210 has the location cookie, the first appliance 202 may then use the cookie to determine where the transfer was interrupted (operation 360) and resume the transfer at the location that the last transfer attempt was interrupted (operation 370). Assuming no errors, the replication process will proceed through to completion (operation 380).

Figure 4:
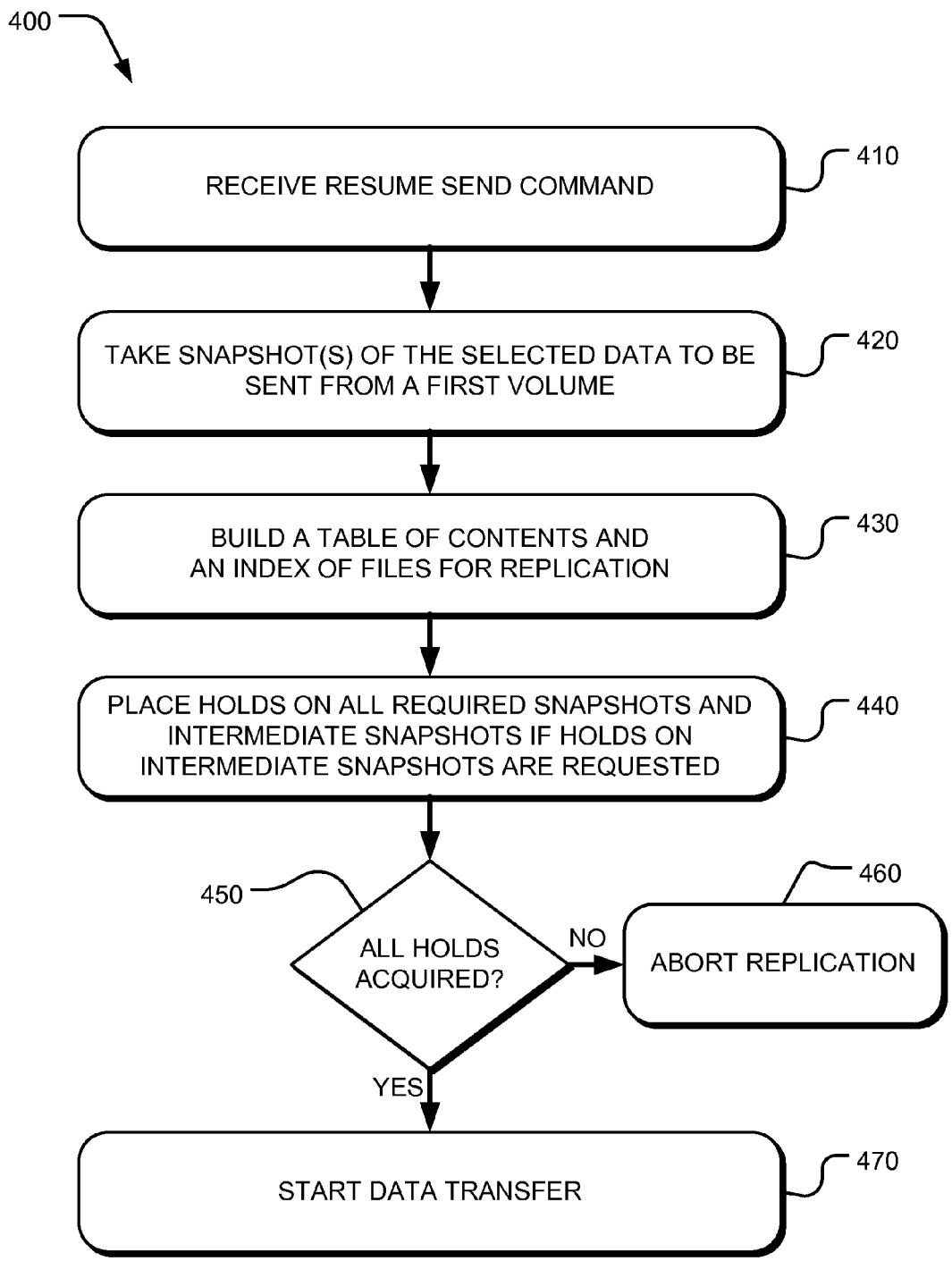
FIG. 4 illustrates example operations for starting a resumable send for replication on a first storage appliance.

Referring now to FIG. 4 and with continued reference to the system depicted in FIG. 2, a more detailed flow diagram describing the operation of the first appliance 202 when a send command is received. In this example, the replication is starting from the beginning as opposed to starting after an interruption. The send command indicates the intent to start replication and includes information related to the replication. The send command includes an indication that the send will be resumable, the data or file systems that will be replicated, and an identification of the destination for the data (operation 410). All of the information included in the send command may be stored as an object referred to as a send-intent on the first appliance 202 for future use. The data that will be sent may include any data on or accessible by the first appliance 202. For example, a user may select to replicate a specific dataset, volume, virtual device 216-220, 224-228, storage pool 214, 222, file system 208, 210, 212, or any other data on the first appliance 202, including cloning all of the data on the first appliance 202. In other words, the send-intent is a record of the requested data including a list of each requested dataset, clone, snapshot, or other data structure, at the moment the send operation was initiated and also includes any metadata associated with the selected data. Once a send-intent has been populated on the first appliance 202, the replication process may begin.

To start the replication process, the appliances produces on or more snapshots of the data indicated in the send-intent (operation 420). A snapshot is a read-only copy of the file system and/or volume of the indicated data. The snapshot can be produced when the send-intent is created and therefore reflect the current state of the data, or it can be from an earlier point in time. Snapshots may include pointers to other snapshots and the snapshot process may operate recursively (often referred to as "atomic snapshots"). For example, if a snapshot spans multiple volumes, such as a snapshot of the file system 208, a recursive snapshot may be created by taking snapshots of the underlying volumes used by the file system 208. For example, if a snapshot of the file system 208 were to be taken recursively and each vdev 216-220 included three volumes, a recursive snapshot would start by taking snapshots of the volumes making up each vdev 216-220, a snapshot of each vdev 216-220 would then include pointers to the snapshots of each volume, and the snapshot of the file system 208 would include pointers to each vdev 216-220. In other words, a recursive snapshot works by splitting the file system into smaller pieces, taking snapshots of the smaller pieces, and then combining the relatively small pieces into a complete snapshot. Once the snapshot process has completed, the replication may continue.

Using the snapshot(s) and the send-intent, a table of contents and index(es) may be generated outlining the data that will be replicated at the second appliance (operation 430). This includes a record of all of the content that will be sent including a complete listing of datasets, clones, and snapshots from the moment that the send was initiated as well as the associated metadata, such as properties, notations of delegated administration rights, notations of requested sharing for each data set, and any other metadata associated with the data being sent. In various implementations, the table of contents and index are configured to be used to determine the location information relative to a data stream using a cookie.

In various implementations, the data that will be sent to the second appliance 204 may be divided into a series of streams referred to as "simple streams." These simple streams may be collectively sent as a compound stream. A compound stream may include one or more simple streams that are sent consecutively, with concurrently, or a combination of multiple simple streams being sent consecutively and concurrently. For example, if a snapshot is dependent on another snapshot, then the simple streams for those snapshots may need to be sent consecutively in the proper order. On the other hand, if snapshots are not dependent on each other, the simple streams of those snapshots may be sent concurrently. In various implementations, each simple stream may include a header identifying the simple stream, a checksum used to for error detection, the simple streams source and destination, and the simple streams location relative to the compound stream.

In one implementation, a simple stream may be a stream of data sent from a first appliance 202 to a second appliance 204 is using the ZFS send functionality, and the compound stream may be the aggregate of a plurality of simple streams. A simple stream may include a single snapshot along with any data associated with the snapshot including any metadata being sent. The simple stream may operate by sending the data in a "chunked" data format, meaning that the data being sent is divided into "chunks" and sent to the second appliance 204. In this example, these data "chunks" are referred to as DRR records. Each DRR record may includes a payload and a header identifying the DRR record being sent, where it is being sent, and the length of the payload (in bits/bytes or other denomination). The DRR record may include a header with a flag signaling that the record is part of a resumable replication, a checksum for the header itself to verify that the header is valid and a location hash identifying the location of the DRR record in the simple stream. For example, in a very simple case, if a stream of 1000 bits were being sent and each record had a size of 100 bits (the first record is bits 0-99, the second record is 100-199, the third record is 200-299, and so on), the third DRR record being sent may include a location hash identifying the DRR record as being the record that starts at bit 200.

In various implementations, the table of contents provides a complete listing of all of the data that will be sent to the second appliance 204 as well as any dependency relationships between the various snapshots and datasets being sent. In addition to the table of contents, the index may include information identifying each of the simple streams being sent, including information for identifying where in the compound stream the simple stream is located. Together, the table of contents and the index allow for identification of where a stream was terminated when provided with a tracking cookie. For example, in various implementations, a tracking cookie may include the header information from the last simple stream received and the last DRR record received. In the event of an error, the cookie may be used in conjunction with the table of contents and index to determine the location in the compound stream where the error occurred.

As the table of contents and index are being constructed, a list of holds is constructed (operation 440). A hold is an operation that stops the modification or deletion of the data being "held." Holds ensure that the data being replicated will align the state of the first appliance 202 when the send command is issued (operation 410). The holds may include all of the snapshots that are included in the send-intent for the replication along with any intermediate snapshots that the snapshots have. The first appliance 202 may then determine if all of the holds are capable of being acquired (operation 450). In some cases, the system may not be able to acquire the necessary holds. The holds may not be acquired, for example, when a system is performing active input/output operations on a file system being replicated. If all of the holds are unable to be acquired, the system may generate and error and abort the replication (460). Otherwise, once all of the holds are acquired, the first appliance 202 may connect to the second appliance 204, which has received a resumable receive command, and begin sending the compound stream to the second appliance 204.

In various implementations, the second appliance 204 may be configured to selectively skip portions of the compound stream. For example, using the table of contents and index, the second appliance 204 may filter the send stream so that it only processes portions of the stream that directly contribute to a requested set of datasets. The second appliance 204 may use the list of data requested, the table of contents, and the index files to identify the specific datasets and snapshots that it requires and their locations. As data is sent using the compound stream, the location information located in the header files of each simple stream and DRR record may be examined to determine the current location in the compound stream. Unneeded portions of the compound stream or parts of simple streams may then skipped and only required information processed.

Figure 5:
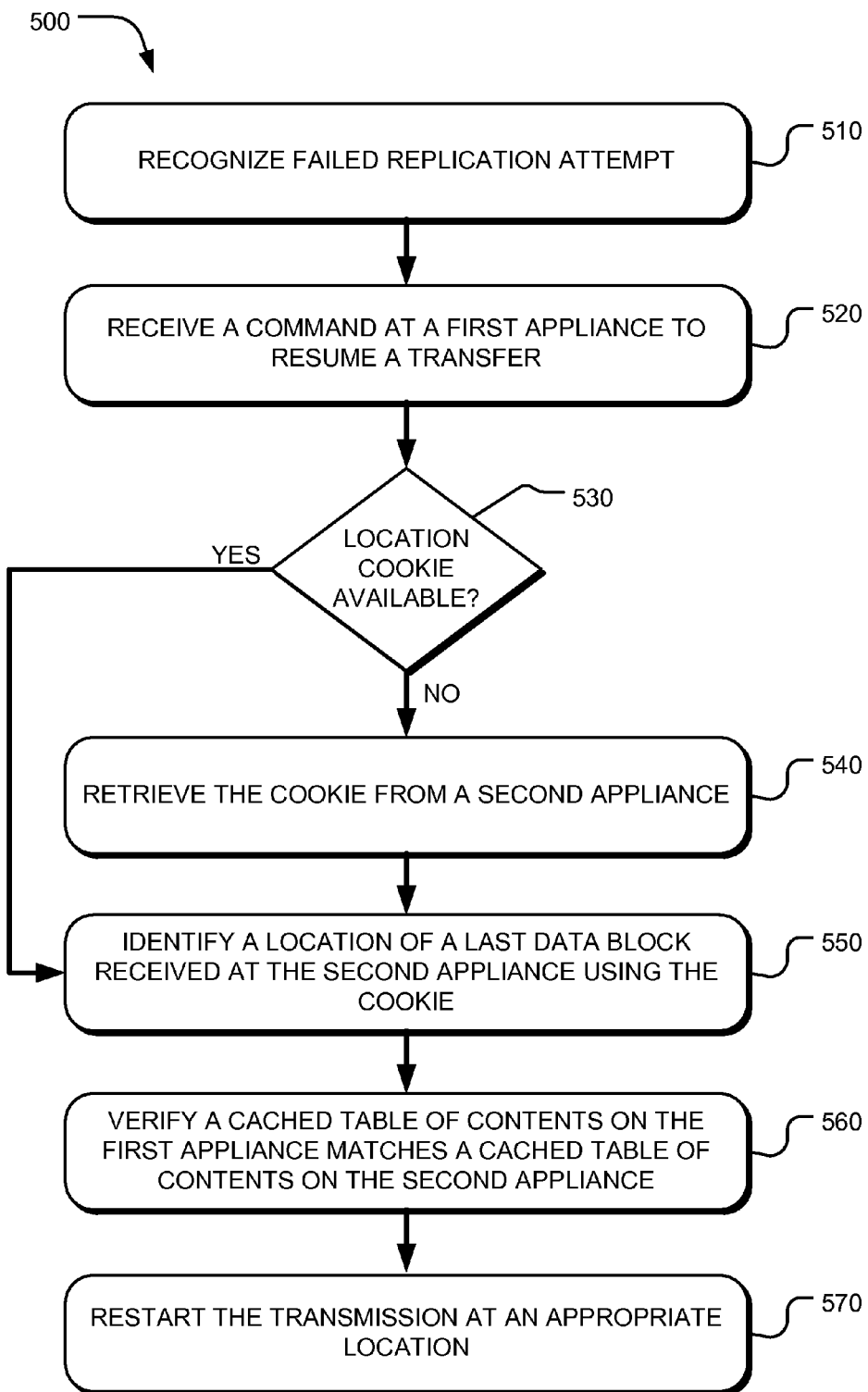
FIG. 5 illustrates example operations for resuming a resumable send for replication on a first storage appliance.

In various cases, the replication between the appliances may be interrupted. Referring now to FIG. 5, a flow chart depicting the resuming of a send is illustrated. Interruptions in replications may become more frequent when the sending process is particularly long. In the event of a send failing, the first appliance 202, the second appliance 204, or both appliances may recognize that the replication has failed (operation 510). Upon recognition of the failure, a command to resume the replication may be issued on the first appliance 202 (operation 520). Before the send can be resumed, the system determines whether a location cookie has been provided (operation 530). As discussed herein, a location cookie is transmitted with the data from the first appliance 202, and identifies the data and its location. The second appliance 204 receiving the replication stores the cookies, and by analysis of the most recent cookie, the location to resume the replication may be identified.

If, on the other hand, the location cookie is not available, then the second appliance 204 may be queried for the location cookie and may send it to the first appliance 202 (operation 540). Once the first appliance 210 has the location cookie, the first appliance 202 may use the location cookie in conjunction with the table of contents and index to determine the location of the last data sent before the interruption (operation 550). The first appliance 202 may also compare its cached table of contents with the table of contents cached on the second appliance 204 (operation 560). If the tables of contents from the appliances are not the same, then an error may be generated and replication may have to resume from the beginning. Otherwise, the first appliance 202 may resume sending data from the point where the last transmission was stopped (operation 570). Once the send is complete, the replication process may be completed.

An administrator may select how a compound stream is resumed. For example, the second appliance 204 may designate that the compound stream be resumed from the beginning and require the first appliance 202 to seek or skip to the appropriate offset in the compound stream designated by the location cookie. In another example, the second appliance 204 may designate that the compound stream be resumed directly from the offset designated by the location cookie.

In various other implementations, the same system for resumable replication may be used for the archiving and restoring of appliance states. Appliances are capable of saving their current state to an archive system. This is often referred to as creating an archive of the appliance. The archive system may include any network attached storage system that is connected to the appliance using a network and has a data capacity that is large enough for performing archive functions for the appliance. For example, the archive system may include a ZFS storage appliance that is connected to the appliance using an Ethernet connection. In another example, the archive system may include a hard disk or tape-based backup system. In this case, the compound data stream may be recorded directly to hard drive or tape, preserving a substantially similar copy of the data stream for future reproduction for restoration. The archive process operates similar to replication, except instead of installing the replicated files on the second system, the files are merely stored on the archive system for future retrieval. Volumes, files systems, or complete machine clones may be selected for archive, packaged and sent as a simple stream or compound stream to the archive system. The archive may then be retrieved by the appliance at a later time and used to restore the appliance back to the state of the appliance when the archive was made.

Figure 6:
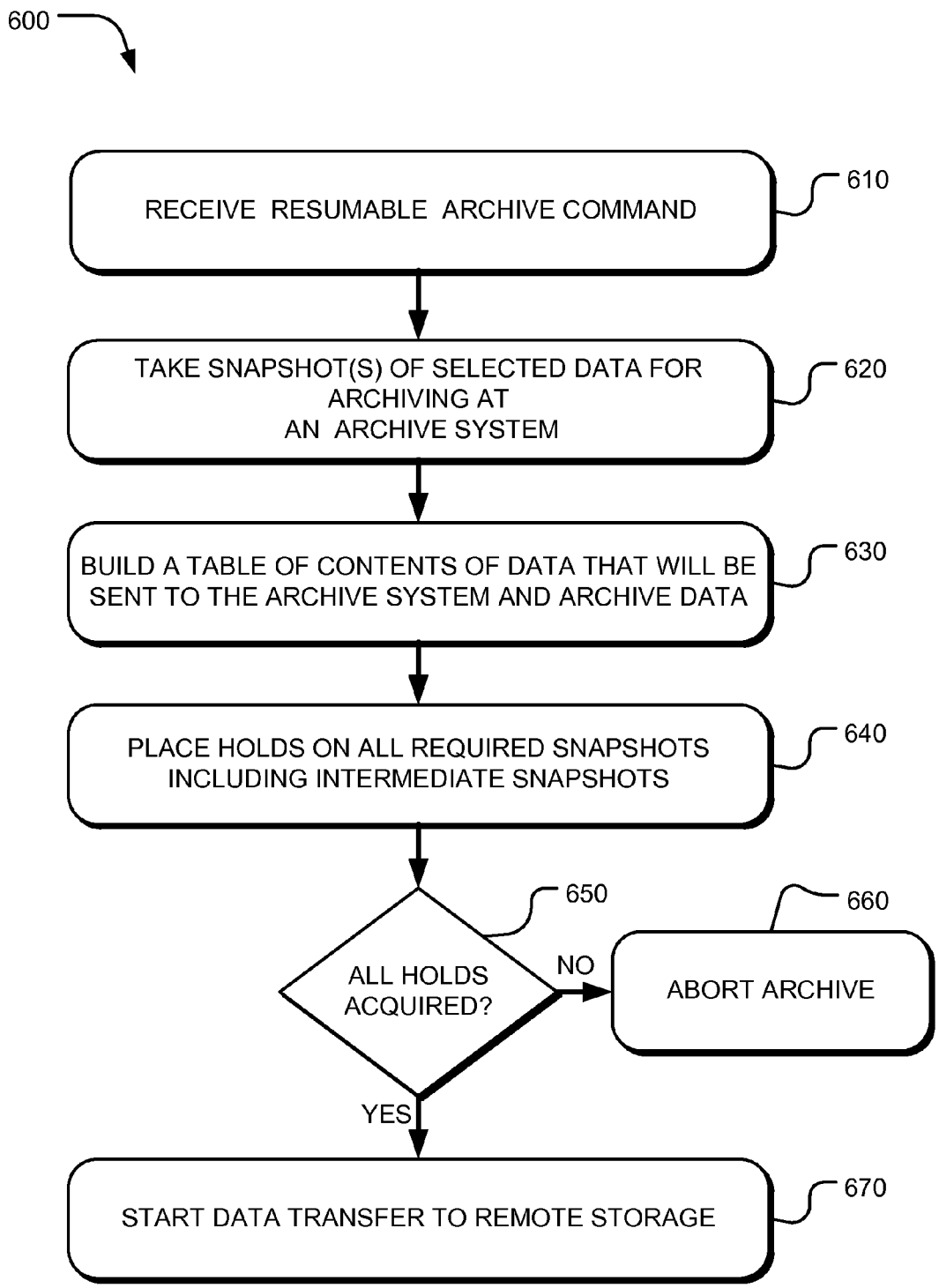
FIG. 6 illustrates example operations for starting a resumable archive on a storage appliance.

Referring now to FIG. 6, a flow diagram depicting a resumable archive of at least one file system operating on a storage appliance is illustrated. The resumable archive process begins with a command to begin a resumable archive being entered on the storage appliance (operation 610). The command to begin a resumable archive may include any information that is useful for creating an archive. For example, the archive command may include an indication that the archive is resumable, the data and/or file systems that have been selected for archive, and the location where the data will be archived. The location may, for example, include a network address for an archive system and a location within a file system operating on the archive system. Once the command to create the archive has been entered, the storage appliance may take snapshots of the data indicated in the archive command (operation 620) and create an archive package. The archive package may include a set of streams sufficient to restore the storage appliance or particular file systems or volumes to the archived state. Once the snapshots have been taken, a table of contents and index sufficient for regenerating the stream may be generated (operation 630). As discussed herein with reference to replication, the table of contents and index include information that outlining the contents of the data being archived and information for linking cookies to the data. In cases of archiving, the table of contents and index may also be sufficient to regenerate a partial stream in the case that a portion of the archived data is destroyed. A partial stream may include any remaining pieces of a stream. For example, if half of an archive streamed was deleted or becomes otherwise unusable, the remaining usable portion of the archived stream may be used to create a partial stream capable of restoring the data present. The table of contents may also include an archive request file used for archiving and restoring operations. The archive request file may include a list of files to include and exclude to perform the archive and restoration.

Once the table of contents has been created, a hold may be placed on snapshots selected for archiving. The hold ensures that any snapshots that are included in archive are not deleted before or during the archive process (operation 640). The storage appliance may determine if the holds were successfully acquired (operation 650). If the holds were not successfully acquired, for example, because a snapshot designated for replication was deleted, an error may be generated and the archive process aborted (operation 660). Otherwise, the storage appliance may start transferring the archive package (operation 670).

In the case of an interruption of the transmission of the archive package, the storage appliance performs similarly to resumable replication as described herein. In the case of a resumable archive, a send failure is recognized and the archive send is resumed at the location the archive left off. If a location cookie is has not been provided then the appliance may retrieve the location cookie from the system storing the archive. Once the location cookie has been retrieved, the location where the archive was stopped may be determined and the transfer may be resumed.

Figure 7:
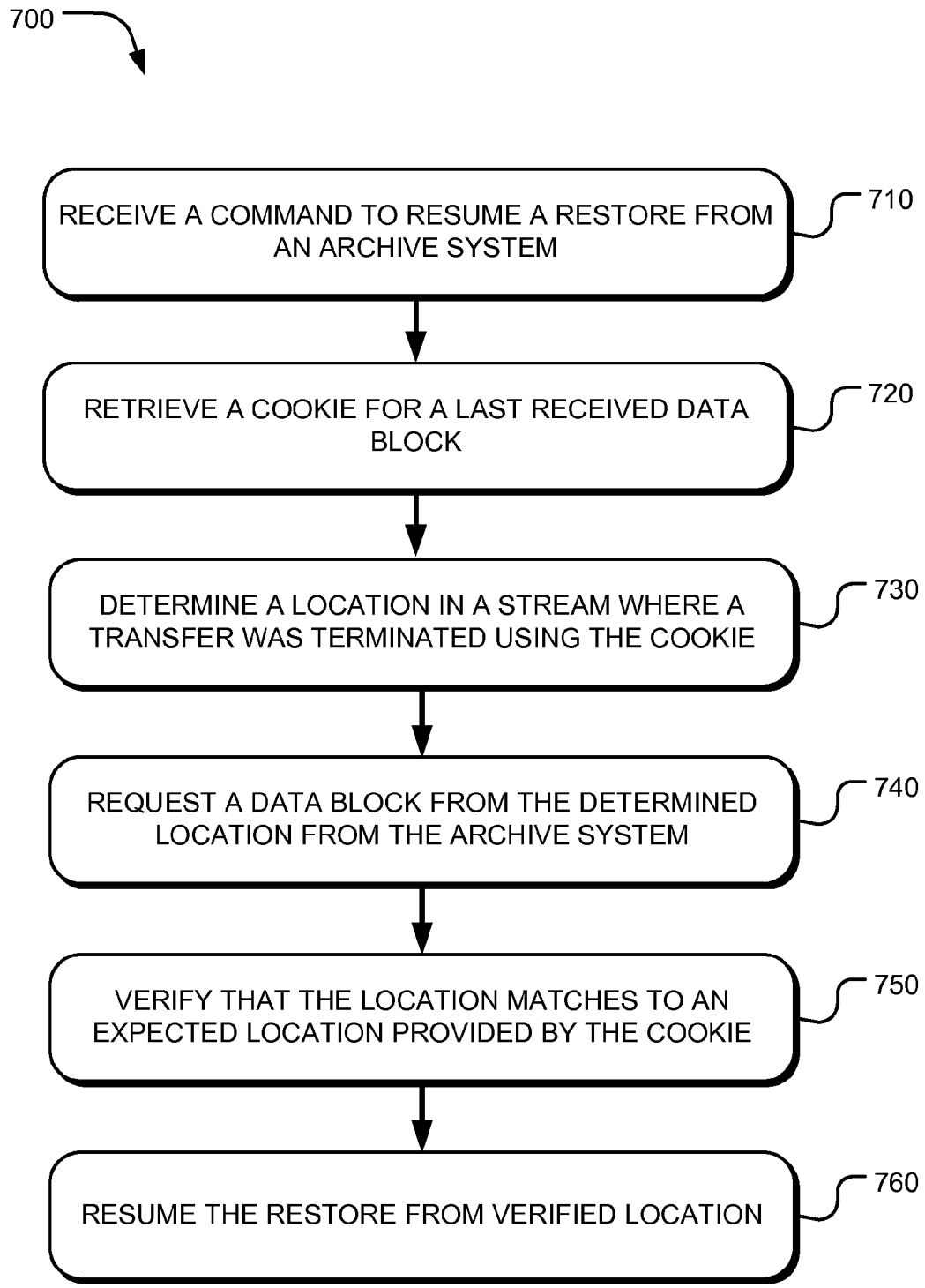
FIG. 7 illustrates example operations for resuming a restore from an archive on a storage appliance.

In many cases, a restore from an archive may simply include starting a resumable restore and transferring the archive package from the archive system to the storage appliance and then using the archive package to perform a system restore. Referring now to FIG. 7, a flow chart depicting a failed restore from an archive being resumed is illustrated. After a restore from an archive has failed, the storage appliance may resume the restore process (operation 710). The storage appliance may retrieve a cookie from the last DRR record that was received (operation 720). Using the cookie in conjunction with the table of contents and index, the appliance may determine the location in the compound stream where the transfer was terminated (operation 730). Once the location in the stream has been determined, the appliance may connect to the archive system and request the DRR record at the identified location. The cookie information of the retrieved DRR record may then be used to verify that the location is correct by comparing the cookie of the DRR record to the cookie of the last cookie received (operation 740). Once the location has been verified, the restoration process may be resumed and continue until the archive has been completely downloaded to the storage appliance and the restore is completed (operation 750).

In various implementations, the restore function may utilize the additional error checking to selectively restore portions of the archive files. For example, when the compound stream is saved, specific blocks or snapshots may be designated as non-reliable using the checksums in DRR and stream headers. Since these block and/or snapshots are no longer reliable, a partial restore may be initiated that avoids the portions of the archived compound stream that cannot be successfully restored.

Figure 8:
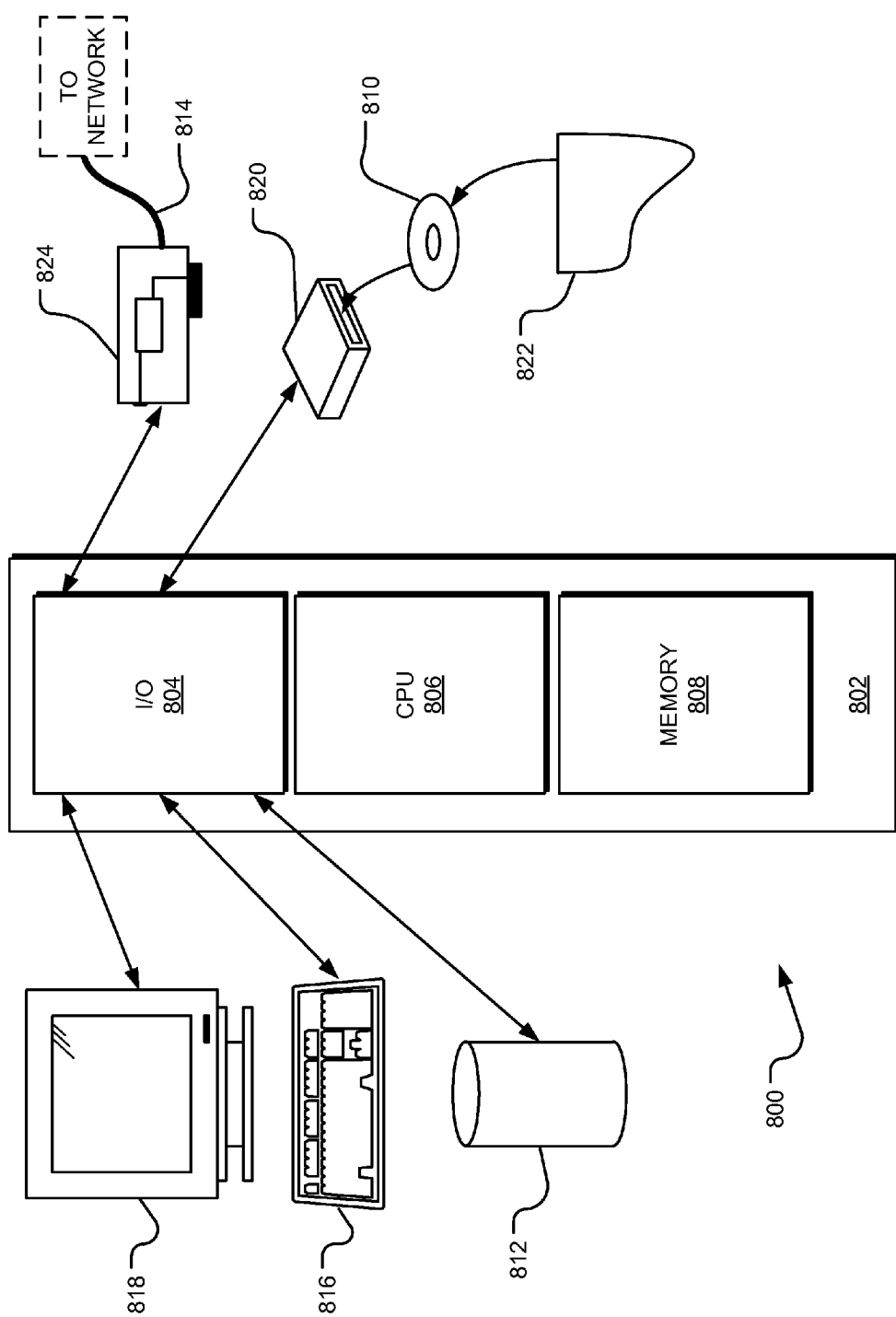
FIG. 8 is an example computing system that may implement various systems and methods discussed herein.

Referring to FIG. 8, a detailed description of an example computing system 800 having one or more computing units that may implement various systems and methods discussed herein is provided. The computing system 800 may be applicable to the user device 104, the server, or other computing devices. It will be appreciated that specific implementations of these devices may be of differing possible specific computing architectures not all of which are specifically discussed herein but will be understood by those of ordinary skill in the art.

The computer system 800 may be a general computing system is capable of executing a computer program product to execute a computer process. Data and program files may be input to the computer system 800, which reads the files and executes the programs therein. Some of the elements of a general purpose computer system 800 are shown in FIG. 20 wherein a processor 802 is shown having an input/output (I/O) section 804, a Central Processing Unit (CPU) 806, and a memory section 808. There may be one or more processors 802, such that the processor 802 of the computer system 800 comprises a single central-processing unit 806, or a plurality of processing units, commonly referred to as a parallel processing environment. The computer system 800 may be a conventional computer, a distributed computer, or any other type of computer, such as one or more external computers made available via a cloud computing architecture. The presently described technology is optionally implemented in software devices loaded in memory 808, stored on a configured DVD/CD-ROM 810 or storage unit 812, and/or communicated via a wired or wireless network link 814, thereby transforming the computer system 800 in FIG. 8 to a special purpose machine for implementing the described operations.

The I/O section 804 is connected to one or more user-interface devices (e.g., a keyboard 816 and a display unit 818), a disc storage unit 812, and a disc drive unit 820. In the case of a tablet or smart phone device, there may not be a physical keyboard but rather a touch screen with a computer generated touch screen keyboard. Generally, the disc drive unit 820 is a DVD/CD-ROM drive unit capable of reading the DVD/CD-ROM medium 810, which typically contains programs and data 822. Computer program products containing mechanisms to effectuate the systems and methods in accordance with the presently described technology may reside in the memory section 804, on a disc storage unit 812, on the DVD/CD-ROM medium 810 of the computer system 800, or on external storage devices made available via a cloud computing architecture with such computer program products, including one or more database management products, web server products, application server products, and/or other additional software components. Alternatively, a disc drive unit 820 may be replaced or supplemented by an optical drive unit, a flash drive unit, magnetic drive unit, or other storage medium drive unit. Similarly, the disc drive unit 820 may be replaced or supplemented with random access memory (RAM), magnetic memory, optical memory, and/or various other possible forms of semiconductor based memories commonly found in smart phones and tablets.

The network adapter 824 is capable of connecting the computer system 800 to a network via the network link 814, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets or slates, multimedia consoles, gaming consoles, set top boxes, etc.

When used in a LAN-networking environment, the computer system 800 is connected (by wired connection or wirelessly) to a local network through the network interface or adapter 824, which is one type of communications device.

When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are examples of communications devices for and other means of establishing a communications link between the computers may be used.

In an example implementation, snapshots, data blocks, a plurality of internal and external databases, source databases, and/or cached data on servers are stored as the memory 808 or other storage systems, such as the disk storage unit 812 or the DVD/CD-ROM medium 810, and/or other external storage devices made available and accessible via a network architecture. Resumable replication software and other modules and services may be embodied by instructions stored on such storage systems and executed by the processor 802.

Some or all of the operations described herein may be performed by the processor 802. Further, local computing systems, remote data sources and/or services, and other associated logic represent firmware, hardware, and/or software configured to control operations of the storage appliances 104-106, the user devices 114-116, and/or other computing units or components of the network environment 100. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 802 and a user may interact with a Graphical User Interface (GUI) using one or more user-interface devices (e.g., the keyboard 816, the display unit 818, and the user devices 114-116) with some of the data in use directly coming from online sources and data stores. The system set forth in FIG. 8 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A method of replicating data comprising:
   beginning a zettabyte file system file transfer from a source computing device to a target computing device, the zettabyte file system file transfer including a send stream generated by the source computing device and configured to be received by the target computing device, the send stream including:
      a table of contents and properties; and
      a one or more snapshots of the source computing device;
   receiving, at the source computing device, a request to resume the zettabyte file system file transfer, including a receive checkpoint, wherein:
      the receive checkpoint is generated by the target computing device after an interruption in the zettabyte file system file transfer; and
      the receive checkpoint includes a bookmark including a byte offset of a byte most recently updated at the target computing device, wherein the byte offset is generated, in part, using the table of contents and properties;
   determining, from the bookmark, a point in the send stream to resume the zettabyte file system file transfer, from the source computing device to the target computing device;
   resuming the zettabyte file system file transfer at the point in the send stream, the resumed zettabyte file system file transfer skipping any of the one or more snapshots already existing on the target computing device; and
   providing a chain of custody of the zettabyte file system file transfer, the chain of custody verifying a complete transfer from the source computing device to the target computing device.

2. The method of claim 1, wherein the source computing device is a source storage appliance and the target computing device is a target storage appliance.

3. The method of claim 1, wherein the data successfully received into the target computing device prior to the interruption includes a resumable dataset.

4. The method of claim 3, wherein the resumable dataset is an incomplete dataset stored persistently on the target computing device, the incomplete dataset including a portion of a single snapshot of the one or more snapshots.

5. The method of claim 4, wherein the resumable dataset is trusted to have been correctly received by the target computing device based on per-record checksums of the send stream.

6. The method of claim 4, wherein the bookmark is used to uniquely identify the state of the resumable dataset after an interruption.

7. The method of claim 6, wherein the point in the send stream is further identified by the bookmark using an object number and an offset number calculated by traversing the resumable dataset for a high water mark of the single snapshot of the one or more snapshots.

8. The method of claim 6, wherein the resumed zettabyte file system file transfer includes sending a bookmark stream for receipt into the resumable dataset, the bookmark stream containing a part of the single snapshot of the one or more snapshots following the bookmark.

9. The method of claim 8, wherein the chain of custody includes verifying the single snapshot of the one or more snapshots is intact by verifying the bookmark included in the bookmark stream matches a corresponding bookmark in the resumable dataset.

10. The method of claim 1, further comprising verifying a request to resume the transfer, by the target computing device, is currently valid based on data stored on the source computing device as compared to data stored on the target computing device following the interruption.

11. The method of claim 1, wherein the receive checkpoint includes how much of the zettabyte files system file transfer was made durable.

12. One or more non-transitory tangible computer-readable storage media storing computer-executable instructions for performing a computer process on a computing system, the computer process comprising:
generating one or more snapshots of contents of a source project on a source, wherein the source comprises a zettabyte files system;
generating a send stream containing the one or more snapshots to update a target package on a target with the contents of the source project, wherein the send stream includes a table of contents and properties;
transferring the send stream to the target;
receiving a request to resume the transfer from the target, including a receive checkpoint, wherein:
the receive checkpoint is generated by the target after an interruption in transfer; and
the receive checkpoint includes a bookmark including a byte offset of a byte most recently updated at the target, wherein the byte offset is generated in part using the table of contents and properties;
determining, from the bookmark, a point in the send stream to resume the transfer;
resuming the transfer of the send stream at the point in the send stream, skipping any of the one or more snapshots already existing on the target; and
verifying a complete transfer of the send stream from the source to the target using a chain of custody.

13. The one or more non-transitory tangible computer-readable storage media of claim 12, wherein the target is a target storage appliance and the source is a source storage appliance.

14. The one or more non-transitory tangible computer-readable storage media of claim 12, wherein the receive checkpoint indicates what data was successfully received into the target during the transfer prior to the interruption.

15. The one or more non-transitory tangible computer-readable storage media of claim 12, wherein the data successfully received into the target prior to the interruption includes a resumable dataset.

16. The one or more non-transitory tangible computer-readable storage media of claim 15, wherein the resumable dataset is an incomplete dataset stored persistently on the target, the incomplete dataset including a portion of a single snapshot of the one or more snapshots.

17. The one or more non-transitory tangible computer-readable storage media of claim 16, wherein the bookmark is used to uniquely identify the state of the resumable dataset.

18. The one or more non-transitory tangible computer-readable storage media of claim 17, wherein the resumed transfer includes sending a bookmark stream for receipt into the resumable dataset, the bookmark stream containing the portion of the single snapshot of the one or more snapshots following the bookmark.

19. A system for replicating data comprising:
a source storage appliance comprising a zettabyte file system configured to:
generate a send stream comprising a table of contents and properties and one or more snapshots of contents of a source project to update a target package;
transfer the send stream to a target storage appliance in communication with the source storage appliance and configured to receive the send stream from the source storage appliance during a transfer;
receive a request to resume the transfer, after an interruption, from the target storage appliance including a receive checkpoint wherein:
the receive checkpoint is generated by the target storage appliance after an interruption in the transfer; and
the receive checkpoint includes a bookmark including a byte offset of a byte most recently updated at the target, wherein the byte offset is generated in part using the table of content and properties; and
the receive checkpoint indicates data successfully received into the target storage appliance during the transfer prior to the interruption;
determine, from the bookmark, a point in the send stream to resume the transfer;
resume the transfer at the point in the send stream, skipping any of the one or more snapshots already existing in the target storage appliance; and
provide a chain of custody of the transfer, the chain of custody verifying a complete transfer to the target storage appliance.

20. The system of claim 19, wherein the data successfully received into the target storage appliance prior to the interruption includes a resumable dataset having an incomplete dataset stored persistently on the target, the incomplete dataset including a portion of a single snapshot of the one or more snapshots.

* * * * *

UNITED STATES PATENT AND TRADEMARK OFFICE
CERTIFICATE OF CORRECTION

PATENT NO. : 9,697,215 B2  
APPLICATION NO. : 14/477582  
DATED : July 4, 2017  
INVENTOR(S) : Sabdar et al.

Page 1 of 1

It is certified that error appears in the above-identified patent and that said Letters Patent is hereby corrected as shown below:

On the Title Page

Column 1, under Related U.S. Application Data, Line 1, delete "61/873,793," and insert -- 61/873,739, --, therefor.

Signed and Sealed this  
First Day of May, 2018

Andrei Iancu  
*Director of the United States Patent and Trademark Office*